(12) United States Patent
Lin

(10) Patent No.: US 7,259,921 B2
(45) Date of Patent: Aug. 21, 2007

(54) ADJUSTABLE OBJECT LENS DEVICE

(75) Inventor: Chi-Shin Lin, Taichung (TW)

(73) Assignee: Asia Optical Co., Inc., Taichung (TW)

(*) Notice: Subject to any disclaimer, the term of this patent is extended or adjusted under 35 U.S.C. 154(b) by 114 days.

(21) Appl. No.: 11/271,832

(22) Filed: Nov. 14, 2005

(65) Prior Publication Data
US 2006/0171043 A1 Aug. 3, 2006

(30) Foreign Application Priority Data
Jan. 28, 2005 (TW) .............................. 94102682 A

(51) Int. Cl.
G02B 15/14 (2006.01)
G02B 7/02 (2006.01)

(52) U.S. Cl. ..................... 359/704; 359/819; 359/694

(58) Field of Classification Search ............... 359/796, 359/819, 821–823, 826, 827, 830, 704, 694, 359/809; 33/292; 356/247; 396/529–531
See application file for complete search history.

(56) References Cited

U.S. PATENT DOCUMENTS 3,161,716 A * 12/1964 Burris et al. ................. 356/247

* cited by examiner

*Primary Examiner*—Alicia M Harrington
(74) *Attorney, Agent, or Firm*—Birch, Stewart, Kolasch & Birch, LLP

(57) ABSTRACT

An adjustable object lens device includes an outer barrel, a rotary component coupled movably to the outer barrel, an object lens unit disposed movably in the outer barrel, a decorative unit coupled to the rotary component, and a limiting unit. The limiting unit includes a press ring that is movably retained in the decorative ring, and that abuts against one end of the object lens unit, and a biasing member disposed in the outer barrel and abutting against the other end of the object lens unit, thereby securing the object lens unit between the biasing member and the press ring.

7 Claims, 7 Drawing Sheets

ADJUSTABLE OBJECT LENS DEVICE

CROSS-REFERENCE TO RELATED APPLICATION

This application claims priority of Taiwanese application No. 094102682, filed on Jan. 28, 2005.

BACKGROUND OF THE INVENTION

1. Field of the Invention

This invention relates to an object lens device, more particularly to an object lens device that permits adjustments to relative distances among components thereof.

2. Description of the Related Art

As shown in FIG. 1, a conventional object lens device 1 can be mounted onto a conventional optical device, such as an optical sight 2. The optical sight 2 includes a first end part 21 that has the conventional object lens device 1 connected thereto, a second end part 23 that is connected to an eyepiece unit 22, and an inverting lens unit (not shown in the figure) disposed between the object lens device 1 and the eyepiece unit 22.

As shown in FIG. 2 and FIG. 3, the object lens device 1 includes an outer barrel 11, a rotary component 12, an object lens unit 13, a decorative unit 14, and a limiting unit 15.

The rotary component 12 is threadedly connected to the outer barrel 11, and can translate along an optical axis (X) when rotated.

The object lens unit 13 is disposed in the outer barrel 11 and is capable of limited translation along the optical axis (X). The object lens unit 13 includes a lens barrel 131 that surrounds the optical axis (X), and two object lenses 132 that are mounted in the lens barrel 131. The lens barrel 131 has first and second ends 133, 134 that are opposite to each other along the optical axis (X).

The decorative unit 14 includes a decorative ring 141 that surrounds the optical axis (X), and a colored ring 142. A part of the decorative ring 141 is threadedly connected to an inner surface 121 of the rotary component 12. The colored ring 142 has opposite ends 143, 144 along the optical axis (X) that abut respectively against the decorative ring 141 and the rotary component 12. The colored ring 142 can prevent excessive screwing between the decorative ring 141 and the rotary component 12. The colored ring 142 also enhances the aesthetic appeal of the conventional object lens device 1 by having a different color from that of the decorative ring 141 and the rotary component 12.

The limiting unit 15 includes a press ring 151 that surrounds the optical axis (X), and a biasing member 152. The press ring 151 is threadedly connected to the inner surface 121 of the rotary component 12, and abuts against the first end 133 of the lens barrel 131. The biasing member 152 is disposed in the outer barrel 12, and abuts against the second end 134 of the lens barrel 131 so that the object lens unit 13 is biased to constantly abut against the press ring 151.

Referring to FIG. 1 and FIG. 3, when a user rotates the rotary component 12, the rotary component 12, together with the press ring 151 and the decorative ring 142, translate along the optical axis (X). Meanwhile, the biasing member 152 reacts to the amount of movement made by the press ring 151 in terms of elastic forces and causes the object lens unit 13 to translate along the optical axis (X) inside the outer barrel 11, thereby performing focusing adjustments.

Although the conventional object lens device 1 is capable of performing focusing adjustments, it has the following shortcomings:

1. In order to increase focusing accuracy, before conventional optical devices, such as the optical sight 2, are delivered from factories, the distance of the object lens unit 13 relative to the eyepiece unit 22 is adjusted to offset parallax by adjusting the depth of the threaded interconnection between the press ring 151 and the rotary component 12. However, the object lens unit 13 usually has a specified total length for application to different optical devices. Therefore, when the total length of the object lens unit 13 is kept constant, while the press ring 151 and the decorative ring 141 are both threadedly connected to the inner surface 121 of the rotary component 12, the press ring 151 is spatially limited by other components of the conventional object lens device 1, thereby resulting in a small distance (L1) for offsetting parallax. The distance (L1) is usually insufficient for offsetting parallax, and thereby affects the focusing accuracy of conventional optical devices.

2. The decorative ring 142 is required to be removed in order to adjust the depth of the threaded interconnection between the press ring 151 and the rotary component 12. Therefore, it is very inconvenient and time-consuming to perform adjustments to offset parallax.

SUMMARY OF THE INVENTION

Therefore, the object of the present invention is to provide an adjustable object lens device that whose adjustments to parallax offset can be performed with ease, and whose range of parallax offset is greater than that of the prior art.

According to the present invention, the adjustable object lens device comprises an outer barrel, a rotary component, an object lens unit, a decorative unit, and a limiting unit. The outer barrel includes a barrel wall that surrounds an optical axis and that confines a compartment. The rotary component includes a control ring that surrounds the optical axis and that is coupled movably to the barrel wall so as to be able to translate along the optical axis. The object lens unit is disposed movably in the compartment of the outer barrel, and includes a lens barrel that surrounds the optical axis, and an object lens component that is mounted in the lens barrel. The decorative unit includes a decorative ring that surrounds the optical axis and that is coupled to the rotary component. The limiting unit includes a press ring that is movably retained in the decorative ring, and a biasing member that is disposed in the compartment of the outer barrel. The lens barrel of the object lens unit has opposite barrel ends that abut respectively against the press ring and the biasing member, so that the object lens unit is retained between the press ring and the biasing member.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
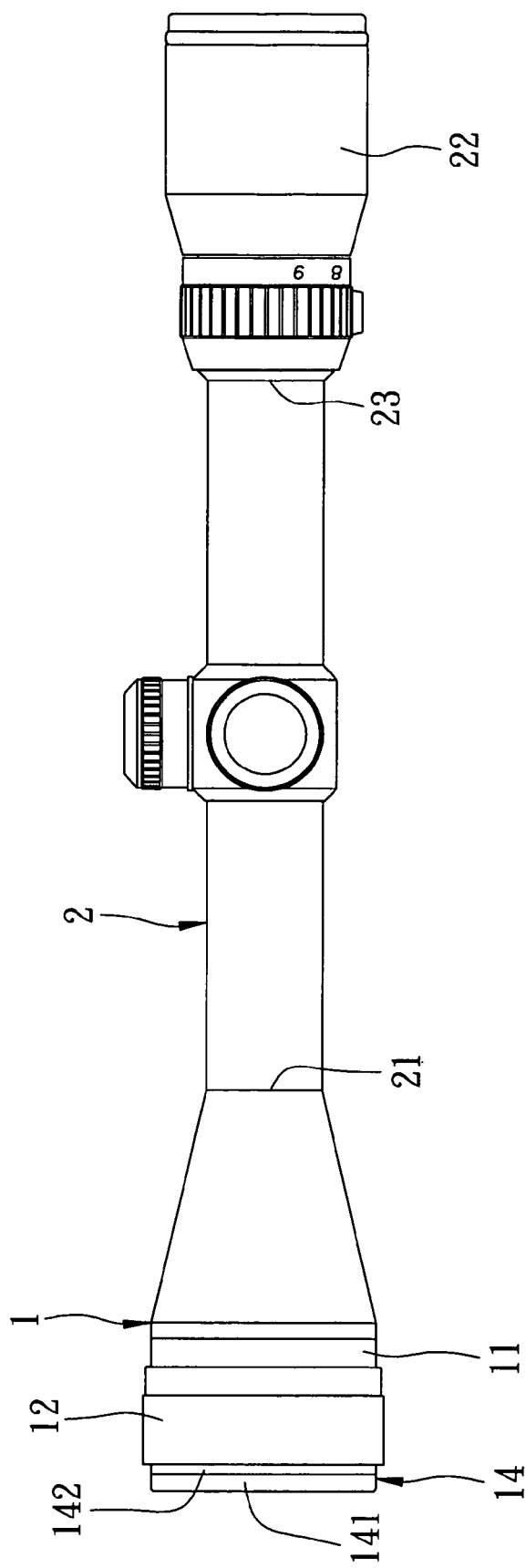
FIG. 1 is a schematic view of a conventional optical sight.
Figure 2:
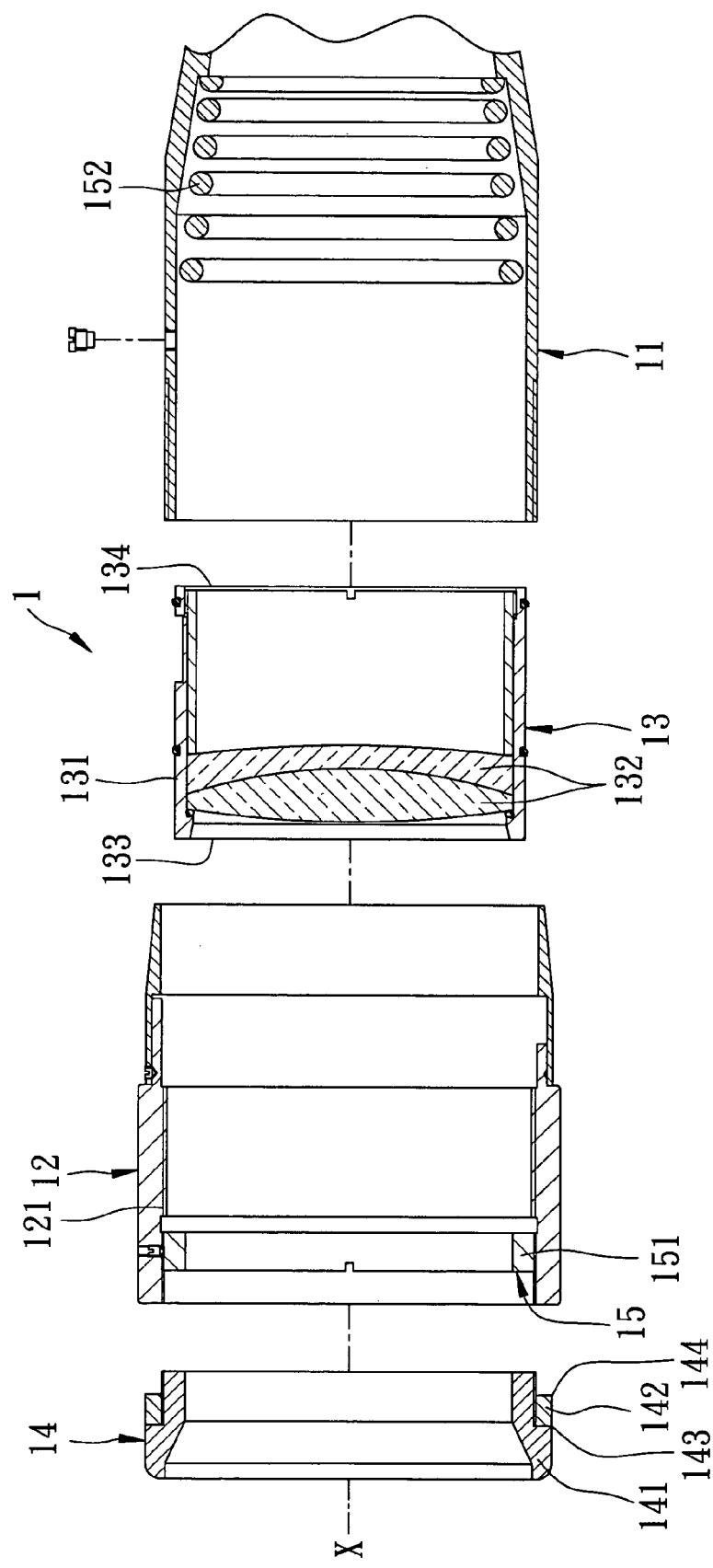
FIG. 2 is an exploded sectional view of a conventional object lens device.
Figure 3:
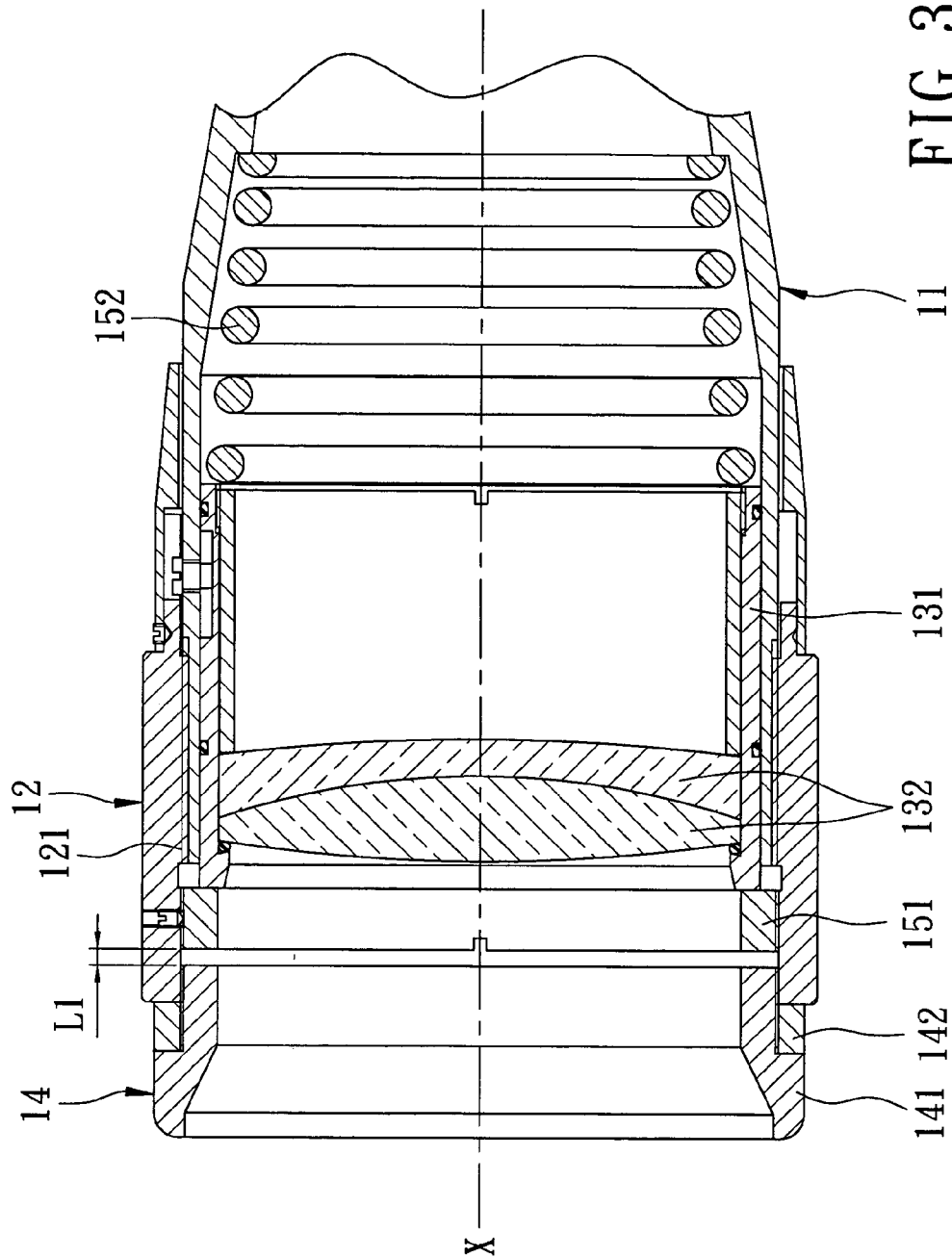
FIG. 3 is an assembled sectional view of the conventional object lens device shown in FIG. 2.
Figure 4:
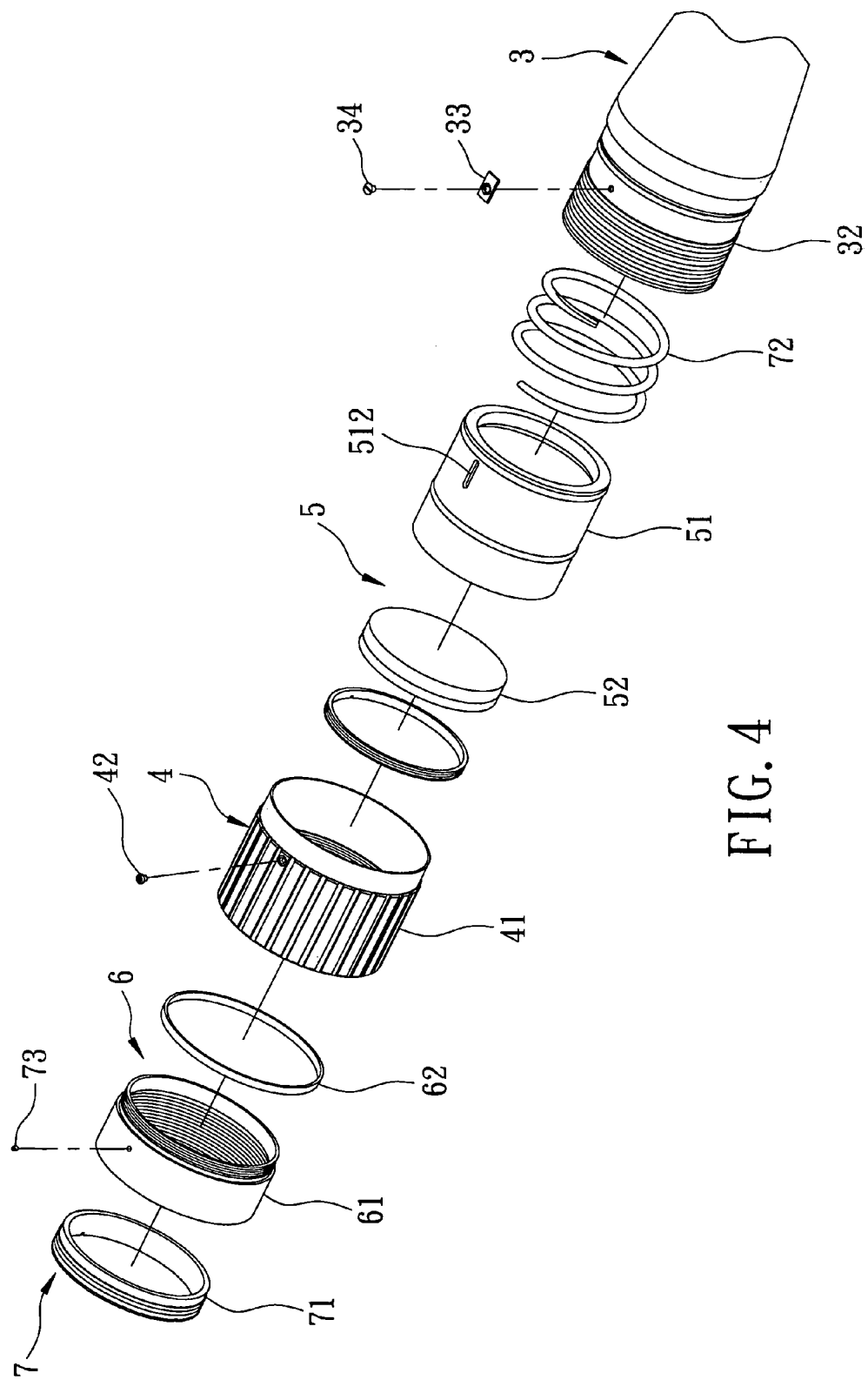
FIG. 4 is an exploded perspective view of the preferred embodiment of an adjustable object lens device according to the present invention.

As shown in FIG. 4, the preferred embodiment of an adjustable object lens device according to the present invention comprises an outer barrel 3, a rotary component 4, an object lens unit 5, a decorative unit 6, and a limiting unit 7.

Figure 5:
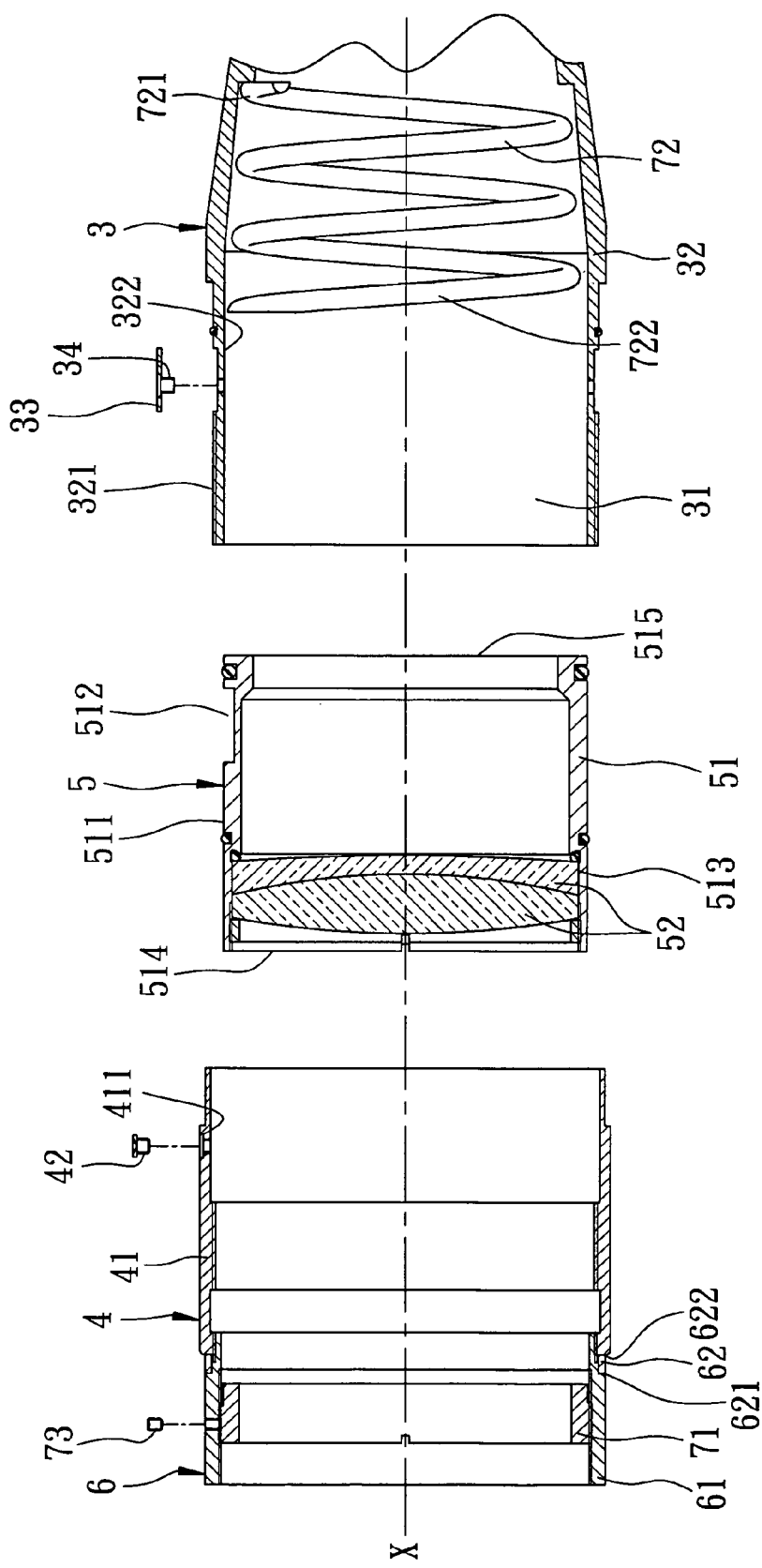
FIG. 5 is an exploded sectional view of the preferred embodiment.
Figure 6:
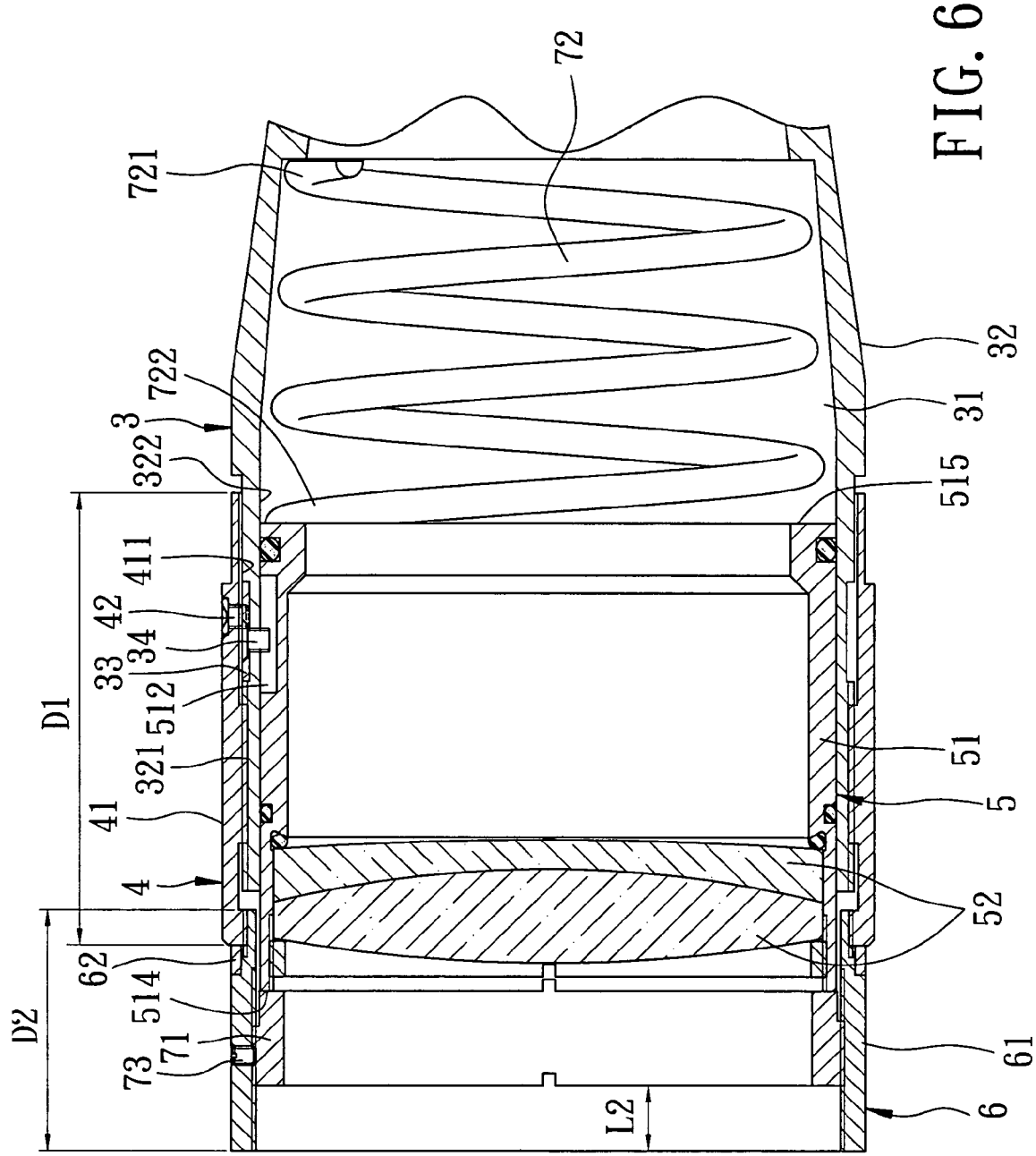
FIG. 6 is an assembled sectional view of the preferred embodiment.

As shown in FIG. 5 and FIG. 6, the outer barrel 3 includes a barrel wall 32 that surrounds an optical axis (X) and that confines a compartment 31, a first stop 33 that is disposed on an outer wall surface 321 of the barrel wall 32, and a limit screw 34 that extends through the first stop 33, that is threadedly connected to the barrel wall 32, and that projects relative to an inner wall surface 322 of the barrel wall 32, thereby fastening the first stop 33 onto the outer wall surface 321 of the barrel wall 32.

The rotary component 4 includes a control ring 41 that surrounds the optical axis (X) and that is coupled movably to the barrel wall 32 so as to be able to translate along the optical axis (X), and a second stop 42 that is at a position corresponding to the first stop 33. The second stop 42 is threadedly connected to the control ring 41 and projects relative to an inner ring surface 411 of the control ring 41. The first and second stops 33, 42 cooperate to limit bi-directional rotation of the control ring 41 relative to the outer barrel 3 to within an angular range smaller than 360 degrees.

The object lens unit 5 is disposed movably in the compartment 31 of the outer barrel 3, and includes a lens barrel 51 that surrounds the optical axis (X), and two object lenses 52 that are secured to an inner surface 513 of the lens barrel 51. The lens barrel 51 has an outer surface 511 that is formed with a guide slot 512 extending parallel to the optical axis (X), a first pressing edge 514 that is formed on a first end of the object lens unit 5 disposed outwardly of the compartment 31, and a second pressing edge 515 that is formed on a second end of the object lens unit 5 and that is opposite to the first pressing edge 514. The limit screw 34 extends radially and threadedly through the barrel wall 32 and into the guide slot 512.

The decorative unit 6 includes a decorative ring 61 that surrounds the optical axis (X), and a colored ring 62. The decorative ring 61 is threadedly connected to the control ring 41. The colored ring 62 has opposite ends 621, 622 along the optical axis (X) that abut respectively against the decorative ring 61 and the control ring 41. Aside from being able to prevent excessive screwing between the decorative ring 61 and the control ring 41, the colored ring 62 also enhances the aesthetic appeal of the object lens device by having a different color from that of the decorative ring 61 and the control ring 41.

The limiting unit 7 includes a press ring 71 that surrounds the optical axis (X), a biasing member 72, and a positioning screw 73. The press ring 71 is threadedly mounted in the decorative ring 61, and abuts against the first pressing edge 514 of the lens barrel 51. The location of the press ring 71 along the optical axis (X) can be adjusted by adjusting the depth of the threaded interconnection with the decorative ring 61. The biasing member 72 in this preferred embodiment is a compression spring and is disposed in the compartment 31 of the outer barrel 3. The biasing member 72 has a first end 721 positioned on the barrel wall 32, and a second end 722 that abuts against the second pressing edge 515 of the lens barrel 51, so that the object lens unit 5 is retained between the biasing member 72 and the press ring 71. The positioning screw 73 extends radially and threadedly through the decorative ring 61 and abuts against the press ring 71, thereby securing the press ring 71 in the decorative ring 61.

In order to perform focusing adjustments, the control ring 41 is rotated by a user to translate along the optical axis (X), while the decorative ring 61 and the press ring 71 move together with the control ring 41. As the press ring 71 moves towards the right of FIG. 5 and FIG. 6 along the optical axis (X), the lens barrel 51 pushes against the biasing member 72 until the left end of the guide slot 512 is blocked by the limit screw 34, thereby decreasing the distance between the object lenses 52 and the eyepiece unit (not shown in the figures). Alternatively, as the press ring 71 moves towards the left of FIG. 5 and FIG. 6 along the optical axis (X), the lens barrel 51 is pushed towards the left of FIG. 5 and FIG. 6 by the biasing member 72 so that the lens barrel 51 constantly abuts against the press ring 71 until the right end of the guide slot 512 is blocked by the limit screw 34, thereby increasing the distance between the object lenses 52 and the eyepiece unit (not shown in the figures).

Figure 7:
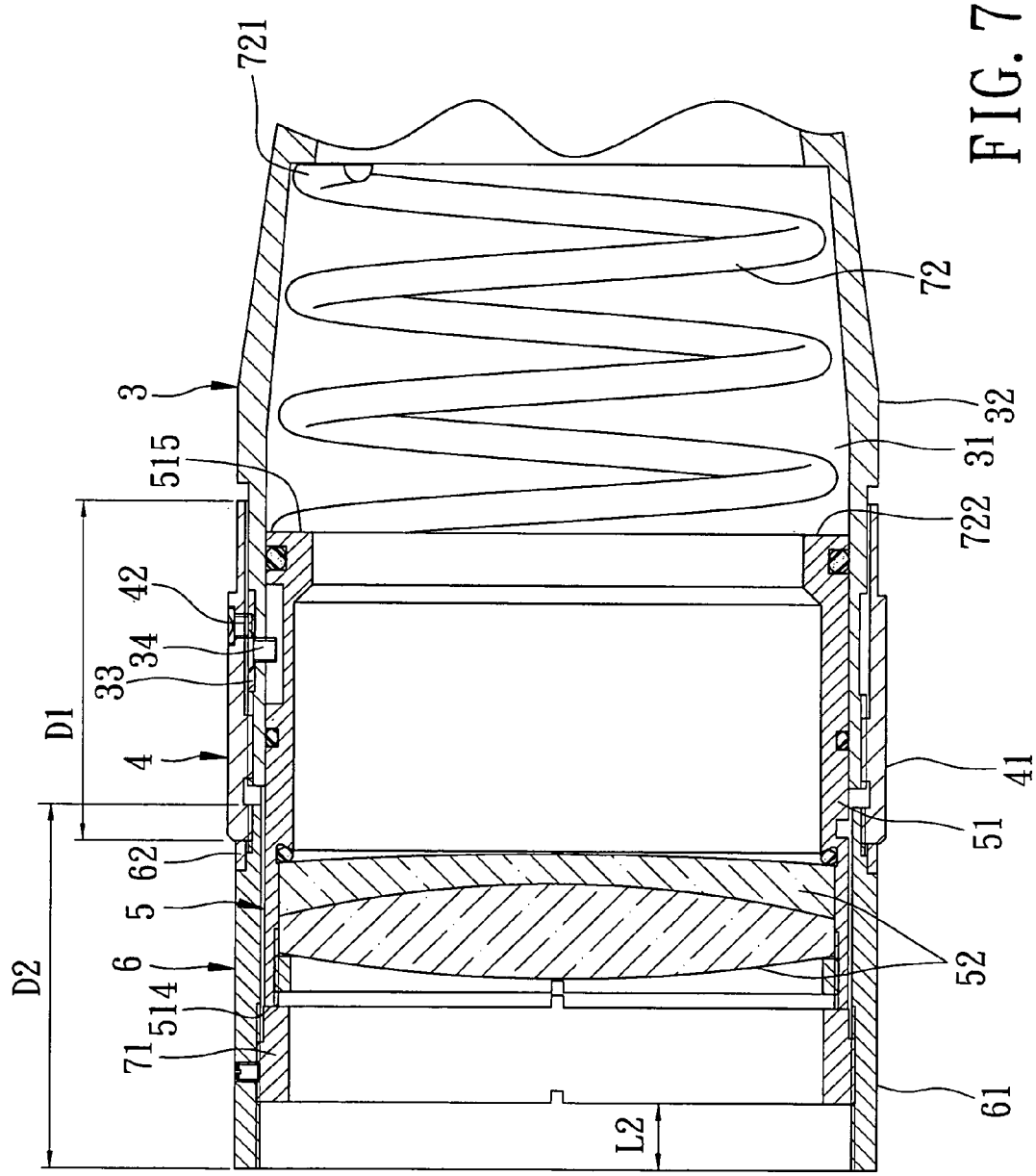
FIG. 7 is an assembled sectional view of a modified preferred embodiment.

As shown in FIG. 6 and FIG. 7, the control ring 41 is threadedly connected to the barrel wall 32 of the outer barrel 3 and to the decorative ring 61, while the press ring 71 is threadedly mounted in the decorative ring 61. Therefore, the control ring 41 is no longer spatially limited by the location of the press ring 71, and adjustments in the locations and distances of the control ring 41 relative to the outer barrel 3 and to the decorative ring 61 are more flexible. As shown in FIG. 6, the length (D1) of the control ring 41 is greater than the length (D2) of the decorative ring 61, and the outer barrel 3 is also lengthy. On the other hand, as shown in FIG. 7, the length (D1) of the control ring 41 is smaller than the length (D2) of the decorative ring 61, and the outer barrel 3 is shorter than that shown in FIG. 6.

Since the press ring 71 is not spatially limited by any other element of the object lens device, the distance (L2) for offsetting parallax is longer as compared to that in the conventional object lens device. That is, when the depth of the interconnection between the press ring 71 and the decorative ring 61 is adjusted to adjust the distance between the object lens unit 5 and the eyepiece unit (not show in the figures), a greater range for offsetting parallax is achieved due to the longer distance (L2) as compared to that in the conventional object lens device.

In addition, when performing adjustments to offset parallax, no components are required to be removed, other than loosening the positioning screw 73, in order to adjust the depth of the threaded interconnection between the press ring 71 and the decorative ring 61.

While the present invention has been described in connection with what is considered the most practical and preferred embodiment, it is understood that this invention is not limited to the disclosed embodiment but is intended to cover various arrangements included within the spirit and scope of the broadest interpretation as to encompass all such modifications and equivalent arrangements.

What is claimed is:

1. An adjustable object lens device comprising:
   an outer barrel having a barrel wall that surrounds an optical axis and that confines a compartment;
   a rotary component including a control ring that surrounds the optical axis and that is coupled movably to said barrel wall so as to be able to translate along the optical axis;
   an object lens unit disposed movably in said compartment of said outer barrel, said object lens unit including a lens barrel that surrounds the optical axis, and an object lens component that is mounted in said lens barrel;
   a decorative unit including a decorative ring that surrounds the optical axis and that is coupled to said rotary component; and
   a limiting unit including a press ring that is movably retained in said decorative ring so as to be adjustable along the optical axis, and a biasing member disposed in said compartment of said outer barrel;
   wherein said lens barrel of said object lens unit has opposite barrel ends that abut respectively against said press ring and said biasing member.

2. The adjustable object lens device as claimed in claim 1, wherein said press ring and said decorative ring are threadedly interconnected.

3. The adjustable object lens device as claimed in claim 1, further comprising a positioning screw that extends radially and threadedly through said decorative ring and that abuts against said press ring.

4. The adjustable object lens device as claimed in claim 1, wherein said control ring and said barrel wall are interconnected threadedly.

5. The adjustable object lens device as claimed in claim 4, wherein:
   said barrel wall has an outer wall surface provided with a first stop; and
   said control ring is provided with a second stop at a position corresponding to said first stop;
   wherein said first and second stops cooperate to limit bi-directional rotation of said control ring relative to said outer barrel to within an angular range smaller than 360 degrees.

6. The adjustable object lens device as claimed in claim 1, wherein:
   said lens barrel of said object lens unit is formed with a guide slot that extends parallel to the optical axis;
   said adjustable object lens device further comprising a limit screw that extends radially and threadedly through said barrel wall and into said guide slot.

7. The adjustable object lens device as claimed in claim 1, wherein said decorative unit further includes a colored ring that surrounds the optical axis and that is retained between said control ring and said decorative ring.

* * * * *